(12) United States Patent
Niimi et al.

(10) Patent No.: US 10,184,463 B2
(45) Date of Patent: Jan. 22, 2019

(54) COMPRESSOR SWASH PLATE AND COMPRESSOR EQUIPPED WITH SAME

(71) Applicant: TAIHO KOGYO Co., Ltd., Toyota-shi, Aichi (JP)

(72) Inventors: Hideki Niimi, Toyota (JP); Masanori Akizuki, Toyota (JP); Hiroshi Kanemitsu, Toyota (JP)

(73) Assignee: TAIHO KOGYO CO., LTD., Toyota-Shi, Aichi (JP)

( * ) Notice: Subject to any disclaimer, the term of this patent is extended or adjusted under 35 U.S.C. 154(b) by 0 days.

(21) Appl. No.: 15/751,952

(22) PCT Filed: Sep. 28, 2016

(86) PCT No.: PCT/JP2016/078571
§ 371 (c)(1),
(2) Date: Feb. 12, 2018

(87) PCT Pub. No.: WO2017/057430
PCT Pub. Date: Apr. 6, 2017

(65) Prior Publication Data
US 2018/0230980 A1 Aug. 16, 2018

(30) Foreign Application Priority Data
Oct. 1, 2015 (JP) .................................. 2015-196293

(51) Int. Cl.
*F16C 33/00* (2006.01)
*F16C 17/00* (2006.01)
(Continued)

(52) U.S. Cl.
CPC .............. *F04B 27/12* (2013.01); *F04B 27/10* (2013.01); *F04B 27/1036* (2013.01);
(Continued)

(58) Field of Classification Search
CPC .. F16C 33/101; F16C 33/1015; F16C 33/106; F16C 33/1065; F16C 33/107;
(Continued)

(56) References Cited

U.S. PATENT DOCUMENTS 6,089,756 A 7/2000 Ono et al.
6,921,205 B2 7/2005 Kanayama et al.
(Continued)

FOREIGN PATENT DOCUMENTS

CN 1459006 A 11/2003
CN 103228913 A 7/2013
(Continued)

OTHER PUBLICATIONS

International Search Report (PCT/ISA/210) dated Nov. 8, 2016, by the Japan Patent Office as the International Searching Authority for International Application No. PCT/JP2016/078571.
(Continued)

*Primary Examiner* — F. Daniel Lopez
*Assistant Examiner* — Dustin T Nguyen
(74) *Attorney, Agent, or Firm* — Buchanan Ingersoll & Rooney PC

(57) ABSTRACT

A compressor swash plate includes a base member having a flat plate shape, and a coating layer formed on a surface of the base member and having projections formed in a linear shape, in which the following inequalities are satisfied when a plane part formed on a prism is pressed against the coating layer with a pressure of 30 MPa: $0.01 \leq B \leq 0.06$ and $10 \leq S \leq 40$, where B indicates widths (mm) of surfaces of the projections in contact with the plane part, and S indicates a percentage (%) of a total sum of an area $S_i$ of the contact surfaces (a gross area of the surfaces of the projections in contact with the plane part) relative to a reference area (an area of a part of the coating layer against which the plane part is pressed).

8 Claims, 9 Drawing Sheets

(51) Int. Cl.
*F04B 27/00* (2006.01)
*F04B 27/12* (2006.01)
*F16C 17/10* (2006.01)
*F16C 33/12* (2006.01)
*F16C 33/10* (2006.01)
*F04B 27/10* (2006.01)

(52) U.S. Cl.
CPC .......... *F16C 17/10* (2013.01); *F16C 33/1065* (2013.01); *F16C 33/12* (2013.01); *F05C 2251/14* (2013.01); *F05C 2253/12* (2013.01); *F16C 2223/42* (2013.01); *F16C 2240/60* (2013.01); *F16C 2300/02* (2013.01)

(58) Field of Classification Search
CPC .......................... F16C 33/1075; F16C 33/208; F16C 2240/60; F04B 27/1036; F04B 27/086; F05C 2253/12
USPC ............................................................. 92/71
See application file for complete search history.

(56) References Cited

U.S. PATENT DOCUMENTS

| | | | | |
|---|---|---|---|---|
| 8,136,417 | B2* | 3/2012 | Kanemitsu | F04B 27/086 384/293 |
| 9,074,628 | B2* | 7/2015 | Yamane | F04B 27/0886 |
| 9,657,818 | B2* | 5/2017 | Akizuki | F04B 27/086 |
| 2003/0111511 | A1* | 6/2003 | Kanayama | F04B 27/0873 228/101 |
| 2006/0083451 | A1* | 4/2006 | Kawagoe | F16C 33/201 384/276 |
| 2008/0112655 | A1* | 5/2008 | Kanemitsu | F04B 27/0886 384/13 |
| 2008/0248249 | A1* | 10/2008 | Kanemitsu | C21D 1/09 428/156 |
| 2009/0205754 | A1* | 8/2009 | Kanemitsu | C21D 1/09 148/500 |
| 2013/0243617 | A1* | 9/2013 | Nomura | F04B 27/0886 417/222.1 |

FOREIGN PATENT DOCUMENTS

| | | |
|---|---|---|
| JP | H 10-259827 A | 9/1998 |
| JP | 2004-211859 A | 7/2004 |
| JP | 2006-266139 A | 10/2006 |
| JP | 4376519 B2 | 12/2009 |
| WO | WO 2012/070615 A1 | 5/2012 |

OTHER PUBLICATIONS

Written Opinion (PCT/ISA/237) dated Nov. 8, 2016, by the Japan Patent Office as the International Searching Authority for International Application No. PCT/JP2016/078571.
International Preliminary Report on Patentability (PCT/IPEA/409) dated Jul. 3, 2017, by the Japan Patent Office as the International Preliminary Examining Authority for International Application No. PCT/JP2016/078571 (with English translation of amended claims).
Office Action dated Oct. 12, 2018, by the Chinese Patent Office in corresponding Chinese Patent Application No. 201680056578.6. (6 pages).

* cited by examiner

COMPRESSOR SWASH PLATE AND COMPRESSOR EQUIPPED WITH SAME

TECHNICAL FIELD

The present invention relates to a compressor swash plate and a compressor equipped with the same.

BACKGROUND ART

Conventionally, techniques for swash plates used in a swash plate-type compressor (compressor swash plate) have been known. For example, Patent Literature 1 discloses such a technique.

Patent Literature 1 discloses a compressor swash plate having a solid lubricant resin coating film on a flat-plate-shaped base member. A sliding surface (surface resin coating layer) of the compressor swash plate is provided with a plurality of concentric grooves extending in a peripheral direction and ridge portions between adjacent ones of the grooves.

Such a compressor swash plate can quickly secure delicate sliding contact of a mating slide member due to wear and deformation of the ridge portions, which makes it possible to enhance initial fitness between the sliding surface and the mating slide member. In addition, the grooves can hold lubricant at root portions thereof, thereby suppressing a temperature rise due to the sliding motion and also enhancing the sliding property.

The technique disclosed in Patent Literature 1, however, has room for improvement, because the degrees of the wear and the deformation change depending on the shape or the material of the surface resin coating layer (ridge portions and groove portions), which may lead to attrition (loss) of the ridge portions (groove portions) in an early stage.

CITATION LIST

Patent Literature

Patent Literature 1 Japanese Patent No. 4,376,519

SUMMARY OF INVENTION

Technical Problem

The present invention has been made in view of the above circumstances and provides a compressor swash plate capable of suppressing attrition of a coating layer and a compressor equipped with the compressor swash plate.

Solution to Problem

The problem to be solved by the present invention is as described above, and the solution to the problem is described below.

Specifically, a compressor swash plate according to the present invention includes a base member having a flat plate shape, and a coating layer formed on a surface of the base member and having a projection formed in a linear shape, in which the following inequalities are satisfied when a plane part formed on a pressing member is pressed against the coating layer with a pressure of 30 MPa, $$0.01 \leq B \leq 0.06 \quad (1)$$

$$10 \leq S \leq 40 \quad (2)$$

where B indicates a width (mm) of a surface of the projection in contact with the plane part, and S indicates a percentage (%) of a gross area of the surface of the projection in contact with the plane part relative to an area of a part of the coating layer against which the plane part is pressed.

In addition, the coating layer satisfies the following inequalities:

$$0.001 \leq H \leq 0.01 \quad (3)$$

$$0.005 \leq T \leq 0.06 \quad (4)$$

where H indicates a height (mm) of the projection when the plane part is pressed against the coating layer, and T indicates a thickness (mm) of the coating layer when the plane part is pressed against the coating layer.

In addition, the projection is formed in a shape of a plurality of concentric circles.

In addition, the projection is formed in a swirling shape.

In addition, the projection is formed in a shape of a plurality of annular rings of which center points are different from each other.

In addition, a compressor according to the present invention includes: the compressor swash plate; a rotary shaft supporting the compressor swash plate in a rotatable manner; and a piston configured to reciprocate as the compressor swash plate rotates.

Advantageous Effects of Invention

The present invention has the following advantageous effect.

According to the present invention, it is possible to suppress attrition of a coating layer.

DESCRIPTION OF EMBODIMENTS

Figure 1:
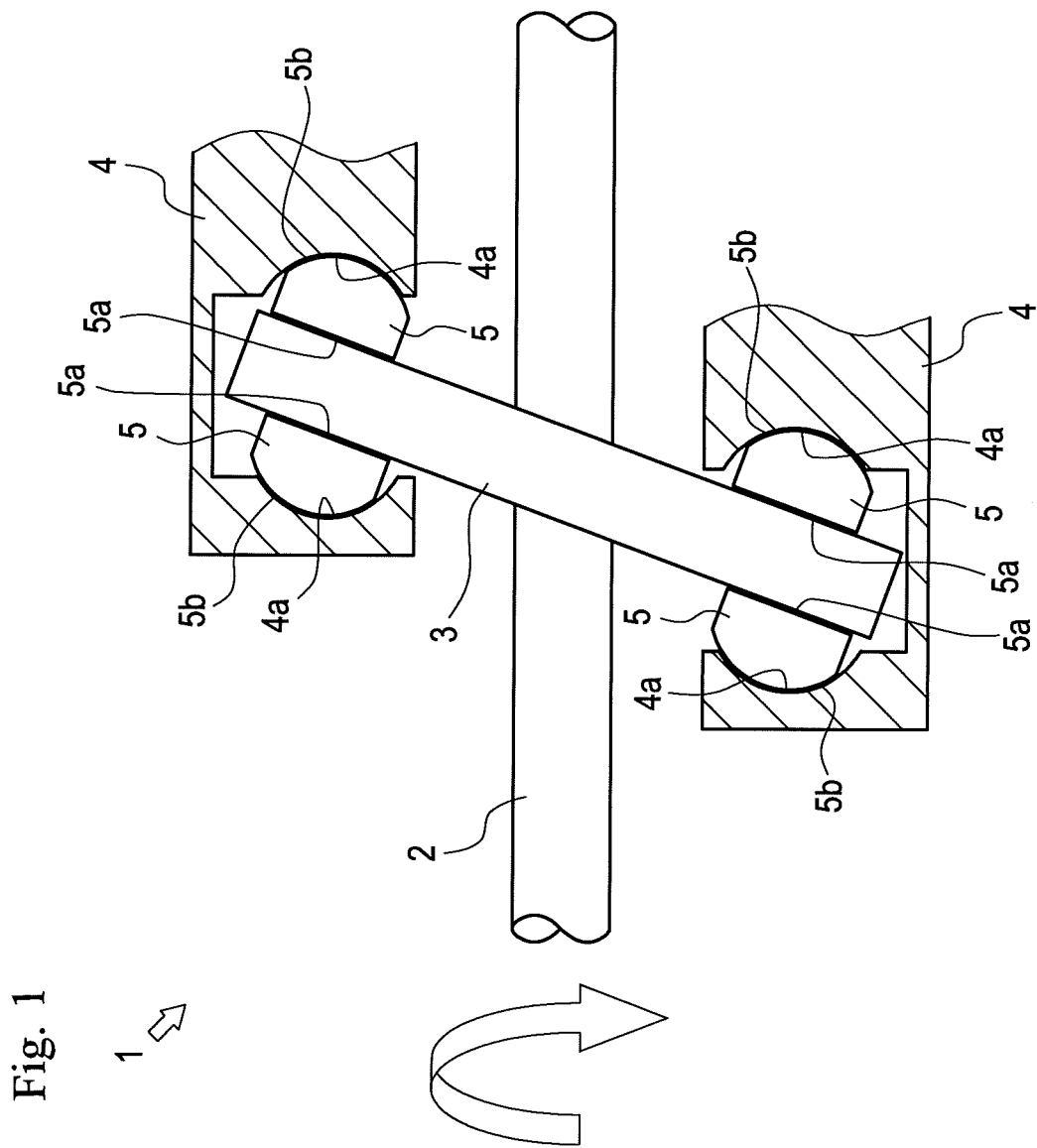
FIG. 1 is a partial sectional side view showing a schematic configuration of a compressor according to a first embodiment.

The drawings used in the following description are schematic diagrams, and dimensions and the like of the components are illustrated figuratively as appropriate for convenience of description.

A schematic configuration of a compressor 1 according to a first embodiment of the present invention is described below with reference to FIGS. 1 and 2. The compressor 1 mainly includes a rotary shaft 2, a swash plate 3, pistons 4, and shoes 5.

The rotary shaft 2 shown in FIG. 1 is rotatably supported by a housing (not shown). The rotary shaft 2 is configured to rotate under power of a driving source (not shown).

The swash plate 3 is formed in a circular flat plate shape. The swash plate 3 is penetrated by the rotary shaft 2 at the center part thereof. The swash plate 3 is fixed to a middle portion of the rotary shaft 2 in an oblique manner with respect to an axial direction of the rotary shaft 2.

The configuration of the swash plate 3 is described in detail later.

The pistons 4 are respectively disposed in cylinder bores (not shown) provided on the housing. The pistons 4 are slidable (configured to reciprocate) in the axial direction of the rotary shaft 2. Each of the pistons 4 is provided with recesses 4a.

The recesses 4a are formed inside each of the pistons 4. The recesses 4a each has a substantially hemispherical shape. The recesses 4a are provided to form a pair in each of the pistons 4 so as to face each other in the axial direction of the rotary shaft 2.

Figure 2:
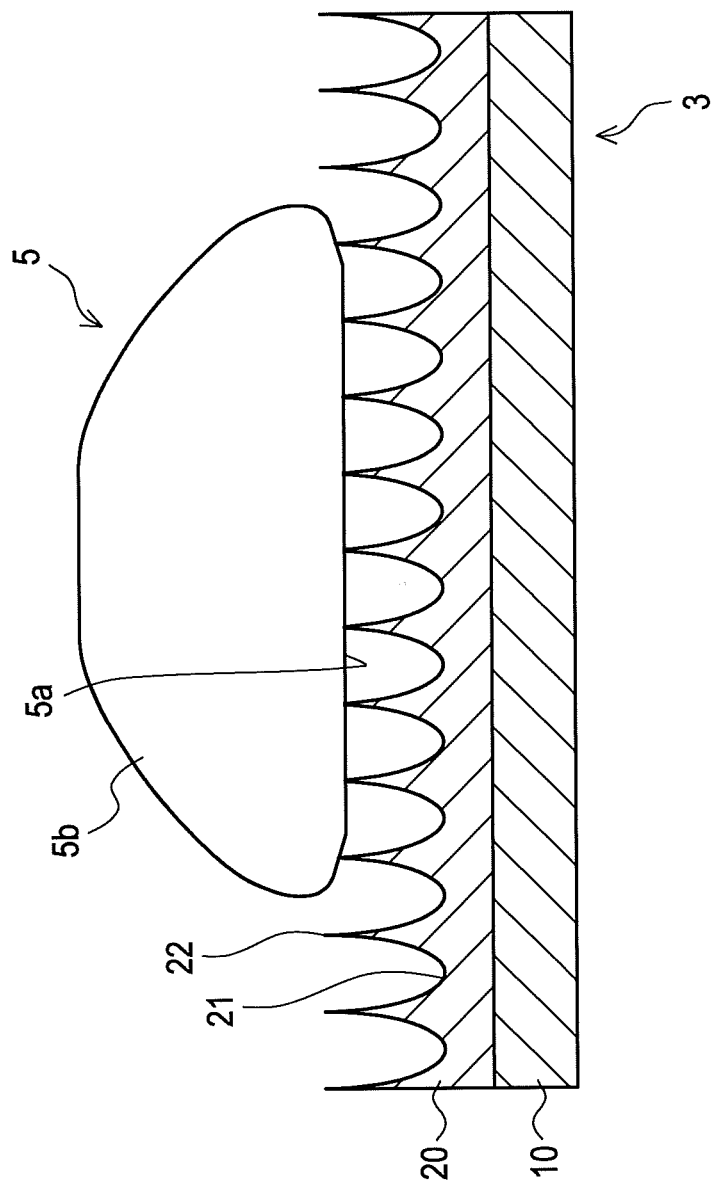
FIG. 2 is a partial sectional side view showing a contact portion between a swash plate and a shoe.

Each of the shoes 5 shown in FIGS. 1 and 2 has a substantially hemispherical shape. Specifically, each of the shoes 5 mainly includes a plane part 5a and a spherical part 5b.

The plane part 5a is a flat surface. The plane part 5a has a substantially circular shape.

The spherical part 5b is a hemispherical surface. The spherical part 5b is formed continuously from the plane part 5a on a side opposite to the plane part 5a.

The shoes 5 are made of an iron-based, copper-based, or aluminum-based material, or a sintering material, a resin material, or the like. In particular, the shoes 5 are preferably formed of a forged or rolled SUJ2.

The shoes 5 formed in this manner are respectively disposed in the recesses 4a of the pistons 4. The spherical part 5b of each of the shoes 5 is disposed in contact with corresponding one of the recesses 4a in a rockable manner. With this configuration, two shoes 5 in each of the pistons 4 are disposed with the plane parts 5a thereof being opposed to each other. The vicinity of the outer periphery of the swash plate 3 is sandwiched between the plane parts 5a of the two shoes 5, In the compressor 1 configured as above, when the rotary shaft 2 rotates, the swash plate 3 rotates together with the rotary shaft 2. Since the swash plate 3 is inclined in the axial direction of the rotary shaft 2, the swash plate 3 causes the pistons 4 to reciprocate (slide) in the axial direction through the shoes 5. At this time, the plane parts 5a of the shoes 5 slide on the surfaces of the swash plate 3.

Figure 3:
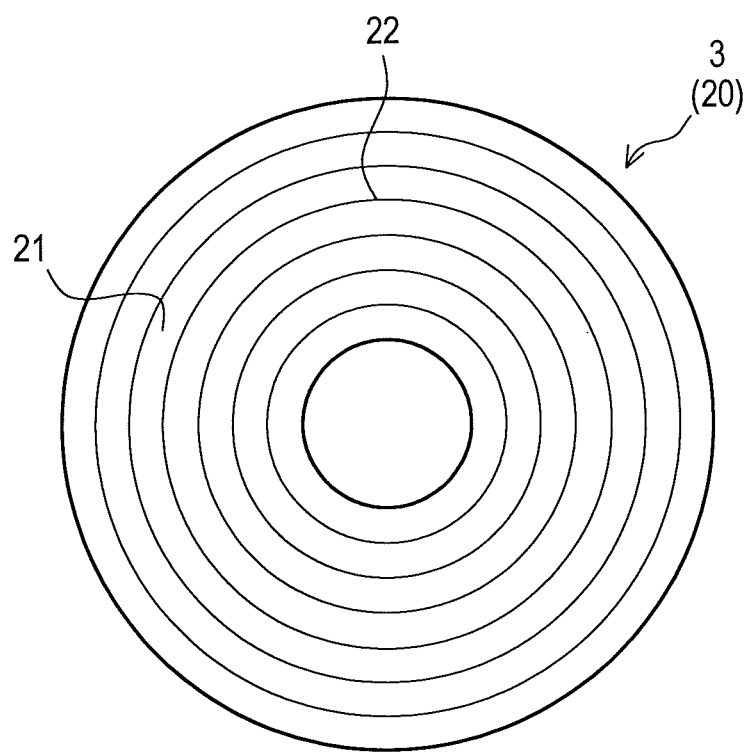
FIG. 3 is a front view of the swash plate showing the shape of projections thereof.

The configuration of the swash plate 3 is detailed below with reference to FIGS. 2 and 3.

The swash plate 3 mainly includes a base member 10 and a coating layer 20.

The base member 10 is a circular flat plate member. The base member 10 is made of an iron-based, copper-based, or aluminum-based material or the like.

The coating layer 20 is formed on a surface (a surface facing a shoe 5) of the base member 10. Note that, although the coating layers 20 are actually formed on both side surfaces of the base member 10, the following description focuses on the coating layer 20 formed on one side surface of the base member 10. The coating layer 20 is formed of a thermosetting resin binder or a thermoplastic resin binder containing a solid lubricant.

Examples of the thermosetting resin binder include, for example, a polyimide-based resin (PI), a polyamide-imide-based resin (PAI), an epoxy resin, and a phenol resin, a polyamide (nylon), an elastomer, or the like. The thermoplastic resin binder may be, for example, a polybenzimidazole resin (PBI), a polyetheretherketone resin (PEEK), or the like.

Examples of the solid lubricant include, for example, a molybdenum disulfide ($MoS_2$), a polytetrafluoroethylene (PTFE), a tungsten disulfide ($WS_2$), a hexagonal boron nitride (h-BN), a graphite fluoride (CF), a fluorine-based resin, or the like. The particle diameter of the solid lubricant is 15 μm or less, preferably 0.2 to 10 μm, and the mixing ratio of the solid lubricant is desirably 5 to 80 wt %.

The coating layer 20 may contain hard particles. Examples of the hard particles include an oxide such as alumina and silica, a nitride such as silicon nitride (SiN), a carbide such as silicon carbide (SiC), a sulfide such as zinc sulfide (ZnS). The particle diameters of the hard particles are desirably 0.01 to 3 μm, and the mixing ratio of the hard particles is desirably 0.2 to 7 wt %.

The coating layer 20 mainly includes groove portions 21 and projections 22.

The groove portions 21 are formed on the surface of the coating layer 20. A plurality of the groove portions 21 are formed concentrically with the swash plate 3. The groove portions 21 are formed by machining (such as cutting) the coating layer 20 after the coating layer 20 is formed on the surface of the base member 10. In the case where the groove portions 21 are formed by cutting, the surface of the coating layer 20 is annularly cut by using a cutting tool. At the time of the cutting, a distance (pitch) between the adjacent ones of the groove portions 21 can be set as appropriate. The sectional shape of the groove portions 21 (see FIG. 2) becomes substantially the same as the shape of the edge of the cutting tool.

The projections 22 are formed on the surface of the coating layer 20. Each of the projections 22 is formed between adjacent ones of the groove portions 21 by forming a plurality of concentric groove portions 21 on the coating layer 20. A plurality of the projections 22 are thus formed concentrically on the surface of the coating layer 20.

When the swash plate 3 thus configured slides on the shoes 5, tip ends of the projections 22 of the coating layer 20 are brought into contact with the plane part 5a of each of the shoes 5. At this time, the coating layer 20 is pressed by the shoes 5 with a predetermined force (pressure), and thus the tip ends of the projections 22 are slightly flattened by elastic deformation.

In the compressor 1 configured as above, the projections 22 of the swash plate 3 elastically deform or wear as appropriate, thereby enhancing initial fitness between the projections 22 and the shoes 5. Each of the shoes 5 comes into contact with a plurality of the projections 22 and the surface pressure due to the shoes 5 is dispersed, which suppresses the elastic deformation of the projections 22 to a low level and also suppresses excessive wear of the projections 22. In addition, the groove portions 21 can hold lubricant therein, thereby suppressing a temperature rise due to the sliding motion and also enhancing the sliding property.

According to the compressor 1 of the present embodiment, the detailed shape of the swash plate 3 is determined particularly to suppress attrition (wear) of the coating layer 20. The configuration of the swash plate 3 is described in further detail below.

Figure 4:
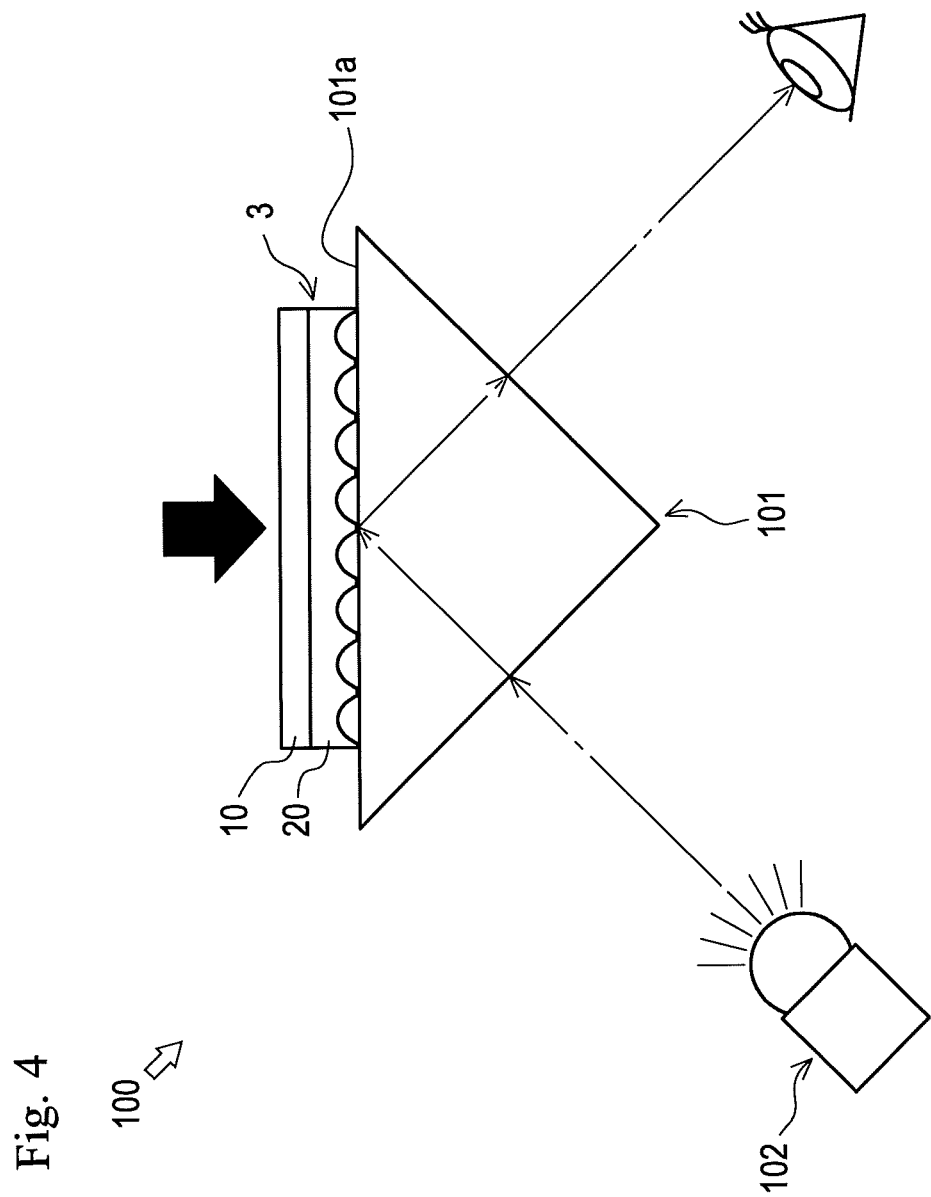
FIG. 4 is a side view showing a schematic configuration of a contact surface observation device.

To describe the swash plate 3 in further detail, a device for measuring a contact surface (a surface in contact with other members) of the swash plate 3 (contact surface observation device 100 (contact microscope) is briefly described first with reference to FIG. 4.

The contact surface observation device 100 is a device to observe a contact surface between solid objects. The contact surface observation device 100 mainly includes a prism 101 and a light source 102.

The prism 101 is a member formed of an appropriate transparent material. The prism 101 is formed in a shape of a substantially triangular pole. The prism 101 has a plane part 101a (one of the three side surfaces) which is a rectangular plane. The prism 101 is disposed with the plane part 101a being directed upward.

The light source 102 is configured to emit light. The light source 102 is disposed below the prism 101. The light from the light source 102 is emitted from below the prism 101 (more specifically, at an angle of 45° diagonally below the prism 101) toward the prism 101 (toward the plane part 101a).

According to the contact surface observation device 100 described above, an observation target member is pressed from above against the plane part 101a of the prism 101 with a predetermined force (pressure). The pressure at the time of the pressing is hereinafter referred to as a load surface pressure. According to the present embodiment, the swash plate 3 (coating layer 20) is the observation target, and thus the swash plate 3 (coating layer 20) is pressed against the plane part 101a of the prism 101. At this time, a specimen cut out from the swash plate 3 into a rectangular shape is used instead of the entire swash plate 3 having a circular flat plate shape. Note that, hereinafter, the swash plate 3 used for observation by the contact surface observation device 100 indicates the specimen.

In this state, light is emitted from the light source 102 and the light (reflected light) reflected by the surface of the swash plate 3 (coating layer 20) is observed. The reflected light is observed visually or by using a camera or the like. The observation of the reflected light makes it possible to observe the contact surface of the swash plate 3 in detail.

In the following, the definition of the dimension of each part of the surface of the swash plate 3 (coating layer 20) to be observed by the contact surface observation device 100 is described with reference to FIG. 5.

As described above, the tip ends of the projections 22 are slightly flattened by elastic deformation when a force is applied to the coating layer 20 by pressing the other member (prism 101). In this state, long narrow plane portions, i.e., contact surfaces in contact with the prism 101 (hatched surfaces in FIGS. 5(a) and 5(b)) are respectively formed at the tip ends of the projections 22. Hereinafter, the width of each of the contact surfaces (the width in the short-side direction) is defined as B (mm). The width B is hereinafter referred to as a "contact width."

Figure 5A:
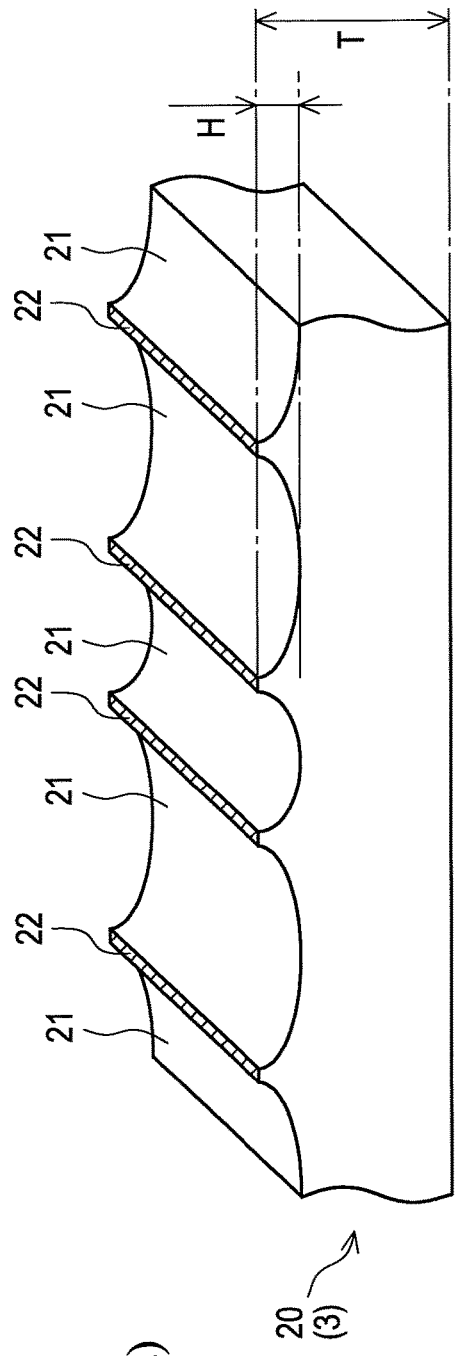
FIG. 5($a$) is a perspective view of the swash plate (specimen) showing the shape of the surface thereof, and FIG. 5($b$) is a front view of the swash plate (specimen) showing the shape of the surface thereof.
Figure 5B:
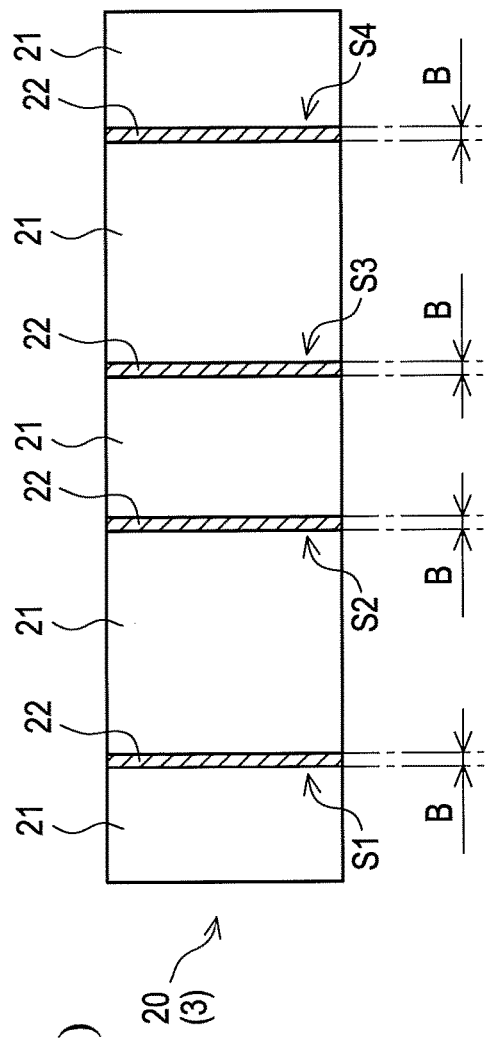

Since a plurality of the projections 22 are formed on the coating layer 20 of the swash plate 3 (specimen), a plurality of contact surfaces in contact with the above prism 101 are also formed. The area of each of the contact surfaces is hereinafter defined as Si (mm$^2$). FIGS. 5(a) and 5(b) exemplify four contact surfaces (the tip ends of the projections 22), and thus exemplify S1, S2, S3, and S4, where i=1, 2, 3, and 4.

The height of the projections 22 in a state in which the prism 101 is pressed against the coating layer 20 is defined as H (mm). More specifically, the height H indicates a height from the bottom of the groove portions 21 to the tip ends (contact surfaces) of the projections 22.

The thickness of the coating layer 20 in a state in which the prism 101 is pressed against the coating layer 20 is defined as T (mm). More specifically, the thickness T is a thickness from the tip ends (contact surfaces) of the projections 22 to the surface opposite to the projections 22.

The following describes a specific value of the size of each part of the coating layer 20 according to the present embodiment when the coating layer 20 is observed by the contact surface observation device 100. Note that, specifically, the swash plate 3 (specimen) shall be pressed against the plane part 101a of the prism 101 with a pressure of 30 (MPa).

In this case, the coating layer 20 according to the present embodiment satisfies the following inequalities (1) and (2).

$$0.01 \leq B \leq 0.06 \tag{1}$$

$$10 \leq S \leq 40 \tag{2}$$

Here, S indicates a percentage (%) of a total sum (gross area) of the areas Si of the contact surfaces relative to a reference area Sc. Hereinafter, S is referred to as a "contact area ratio." The reference area Sc indicates an area of the swash plate 3 to be observed by the contact surface observation device 100, i.e., an area of the specimen. Accordingly, the contact area ratio S is calculated by an equation "$S=\Sigma Si/Sc$ (%)."

Although the present embodiment exemplifies a case in which the contact widths B of the plurality of projections 22 have the same value (see FIG. 5), the contact widths B of the plurality of projections 22 may have different values. In such a case, all of the contact widths B desirably satisfy the inequality (1).

The coating layer 20 according to the present embodiment is set to satisfy the following inequalities (3) and (4).

$$0.001 \leq H \leq 0.01 \tag{3}$$

$$0.005 \leq T \leq 0.06 \tag{4}$$

The coating layer 20 set in this manner allows the surface of the swash plate 3 (projections 22) to elastically deform to an appropriate extent, whereby oil films (lubricating films) are easily held on the tip ends (contact surfaces) of the projections 22. This suppresses attrition (wear) of the coating layer 20. In addition, elastohydrodynamic lubrication occurs at each of the contact surfaces, which increases the areas of the oil films and reduces the surface pressure. As a result, a favorable lubricated state can be maintained. In this manner, the compressor 1 (swash plate 3) according to the present embodiment enables reduction in a shear resistance, heat generation, and the like, which in turn leads to reducing a frictional force and suppressing wear.

Figure 6:
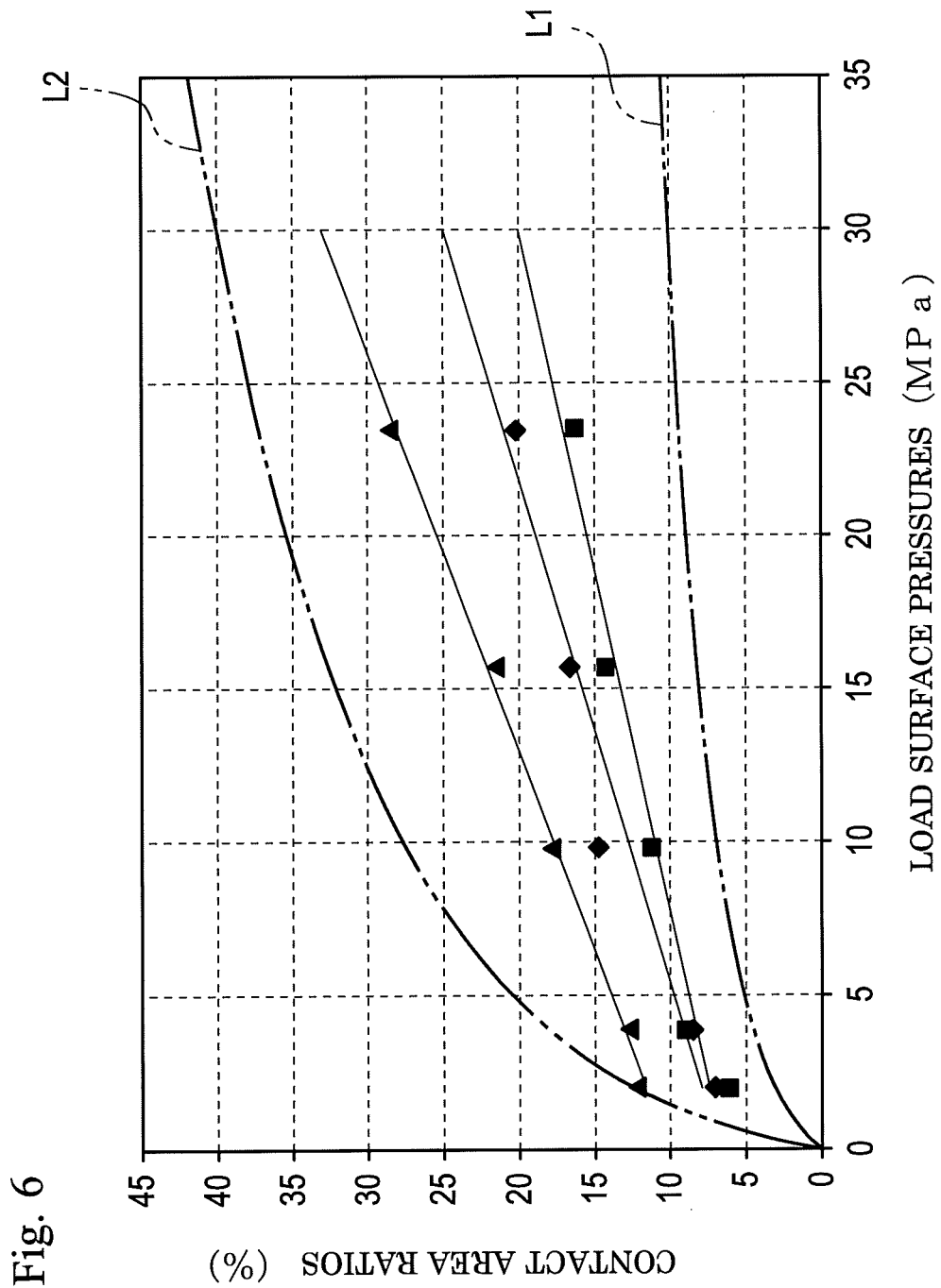
FIG. 6 is a graph showing values of contact area ratios relative to load surface pressures.
Figure 7:
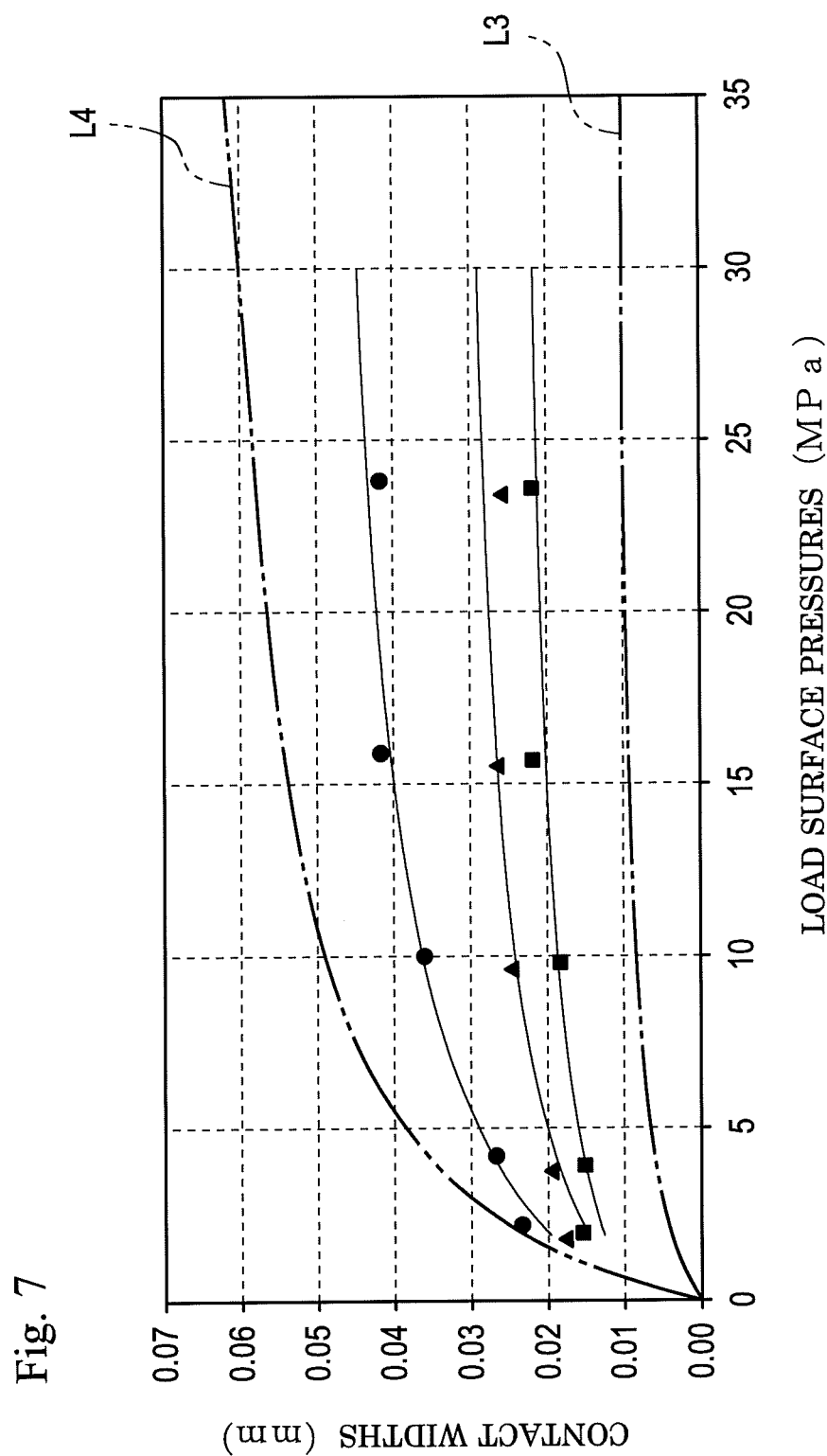
FIG. 7 is a graph showing values of contact widths relative to the load surface pressures.

FIGS. 6 and 7 exemplify observation results obtained by observing the swash plate 3 including the coating layer 20 set to satisfy the inequalities (1) to (4) by the contact surface observation device 100.

Specifically, FIG. 6 shows values of contact area ratios S relative to load surface pressures. In FIG. 6, data of three types of swash plates 3 formed of different materials (the materials of the base member 10 and the coating layer 20) are denoted by different symbols. FIG. 6 shows a graph L1 of a logarithmic function that indicates the contact area ratio S=10(%) when the load surface pressure is 30 (MPa), and also a graph L2 of a logarithmic function that indicates the contact area ratio S=40(%) when the load surface pressure is 30 (MPa).

As can be seen from FIG. 6, the swash plate 3 in this example is set to satisfy the inequality (2) when the load surface pressure is 30 (MPa). In particular, the swash plate 3 in this example is set such that the values of contact area ratios S are included within the area between the graphs L1 and L2.

FIG. 7 shows values of the contact widths B relative to the load surface pressures. In FIG. 7, data of three types of swash plates 3 that are set to differ in the height H of the projections 22 and in the thickness T of the coating layer 20 are denoted by different symbols. FIG. 7 shows a graph L3 of a logarithmic function that indicates the contact width B=0.01 (mm) when the load surface pressure is 30 (MPa) and also a graph L4 of a logarithmic function that indicates the contact width B=0.06 (mm) when the load surface pressure is 30 (MPa).

As can be seen from FIG. 7, the swash plate 3 in this example is set to satisfy the inequality (1) when the load surface pressure is 30 (MPa). In particular, the swash plate 3 in this example is set such that the values of the contact widths B are included within the area between the graphs L3 and L4.

As described above, the swash plate 3 (compressor swash plate) according to the present invention includes the base member 10 having a flat plate shape, and the coating layer 20 formed on a surface of the base member 10 and having the projections 22 each formed in a linear shape, in which the following inequalities are satisfied when the plane part 101a formed on the prism 101 (pressing member) is pressed against the coating layer 20 with a pressure of 30 MPa, $$0.01 \leq B \leq 0.06 \quad (1)$$

$$10 \leq S \leq 40 \quad (2)$$

where B indicates the widths (mm) of the surfaces of the projections 22 in contact with the plane part 101a, and S indicates a percentage (%) of the total sum of an area Si of the contact surfaces (a gross area of the surfaces of the projections 22 in contact with the plane part 101a) relative to a reference area Sc (an area of a part of the coating layer 20 against which the plane part 101a is pressed).

This configuration suppresses attrition of the coating layer 20.

In other words, the coating layer 20 set in this manner allows the surface of the swash plate 3 (projections 22) to elastically deform adequately, whereby oil films (lubricating films) are easily held on the tip ends (contact surfaces) of the projections 22. This suppresses attrition (wear) of the coating layer 20.

In addition, the coating layer 20 satisfies the following inequalities:

$$0.001 \leq H \leq 0.01 \quad (3)$$

$$0.005 \leq T \leq 0.06 \quad (4)$$

where H indicates a height (mm) of the projections 22 when the plane part 101a is pressed against the coating layer 20, and T indicates a thickness (mm) of the coating layer 20 when the plane part 101a is pressed against the coating layer 20.

This configuration suppresses attrition of the coating layer 20.

In other words, the coating layer 20 set in this manner allows the surface of the swash plate 3 (projections 22) to elastically deform adequately, whereby oil films (lubricating films) are easily held on the tip ends (contact surfaces) of the projections 22. This suppresses attrition (wear) of the coating layer 20.

In the case where the groove portions 21 are formed by cutting, the height H of the projections 22 and the thickness T of the coating layer 20 can be adjusted as appropriate by adjusting the feeding amount (pitch) of the cutting tool.

The projections 22 have a shape of a plurality of concentric circles.

This configuration suppresses attrition of the coating layer 20.

In other words, an appropriate interval is provided between adjacent ones of the projections 22, so that lubricant can be held between the projections 22, thereby increasing the sliding property. In particular, the projections 22 are formed concentrically with the swash plate 3 as in the present embodiment, so that the direction in which the projections 22 are formed substantially coincides with the sliding direction of the shoes 5. With this configuration, the shoes 5 can slide on the swash plate 3 with a substantially constant pressure, and attrition of the coating layer 20 can be effectively suppressed.

The compressor 1 according to the present embodiment includes the swash plate 3, the rotary shaft 2 supporting the swash plate 3 in a rotatable manner, and the pistons 4 configured to reciprocate as the swash plate 3 rotates.

This configuration suppresses attrition of the coating layer 20.

Note that the swash plate 3 according to the present embodiment is one embodiment of the compressor swash plate of the present invention.

The prism 101 according to the present embodiment is one embodiment of the pressing member of the present invention.

Although the embodiment of the present invention has been described above, the present invention is not limited to the above configuration, and various modifications and changes can be made without departing from the scope of the invention as set forth in the claims.

Other embodiments of the compressor swash plate according to the present invention are described below.

Figure 8A:
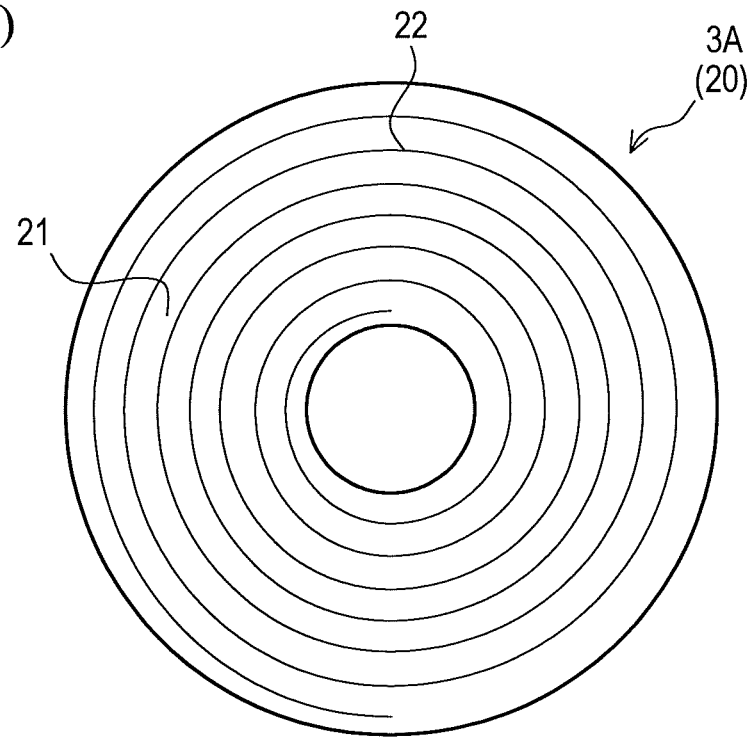
FIG. 8($a$) is a front view of a swash plate according to a second embodiment, and FIG. 8($b$) is a front view of a swash plate according to a third embodiment.

The projections 22 may be formed in a swirling (spiral) shape like the swash plate 3A according to a second embodiment as shown in FIG. 8(a). In this case, the projections 22 formed in a swirling (spiral) shape are obtained by forming the groove portions 21 in a swirling shape.

As described above, the projections 22 according to the second embodiment have a swirling shape.

This configuration suppresses attrition of the coating layer 20.

In other words, lubricant can be held in the swirling-shaped groove portions 21 adjacent to the projections 22, thereby enhancing the sliding property.

Figure 8B:
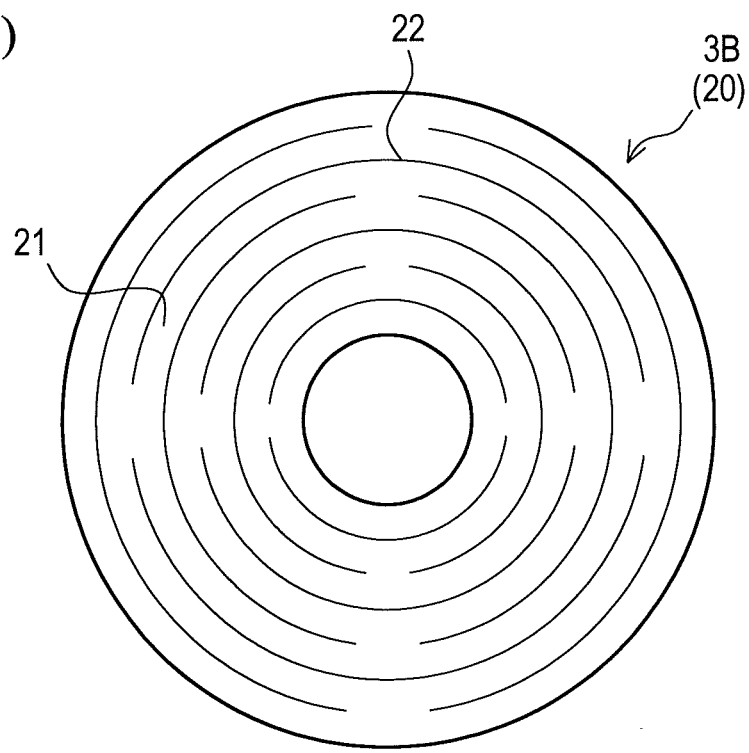

The projections 22 may be formed in a shape of a plurality of concentric circular arcs like a swash plate 3B according to a third embodiment as shown in FIG. 8(b). Specifically, the projections 22 of the swash plate 3B is formed in a shape in which portions (two portions opposing across the center, hereinafter referred to as split portions) of concentric circles are split. With this configuration, each of the projections 22 has a circular arc shape having a central angle of substantially 180°. The split portions of radially adjacent projections 22 are formed so as not to face each other in the radial direction. Specifically, the split portions of radially adjacent projections 22 are formed at positions shifted away from each other in the peripheral direction by a predetermined angle (90° in FIG. 8(b)). With this configuration, the groove portions 21 can easily hold lubricant.

Figure 9A:
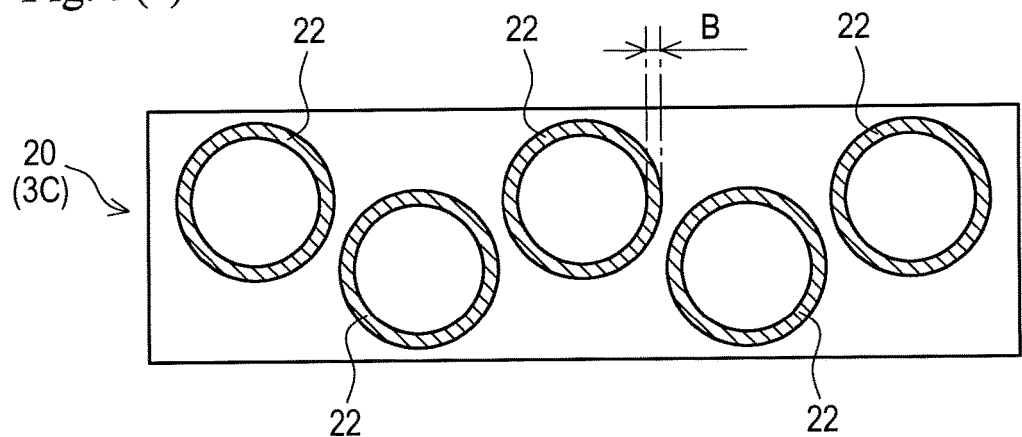
FIG. 9($a$) is a front view of a swash plate (specimen) according to a fourth embodiment showing the shape of the surface thereof, and FIG. 9($b$) is a front view of a swash plate (specimen) according to a fifth embodiment showing the shape of the surface thereof.

The projections 22 may be formed in a shape of a plurality of annular rings like a swash plate 3C according to a fourth embodiment as shown in FIG. 9(a). Specifically, the plurality of projections 22 may be formed in a shape of a plurality of annular rings having substantially the same radius. The projections 22 are formed so as to have different center points and so as not to overlap with each other.

As described above, the projections 22 according to the fourth embodiment are formed in a shape of a plurality of annular rings of which center points are different from each other.

This configuration suppresses attrition of the coating layer 20.

In other words, lubricant can be held inside the projections 22, thereby enhancing the sliding property.

Figure 9B:
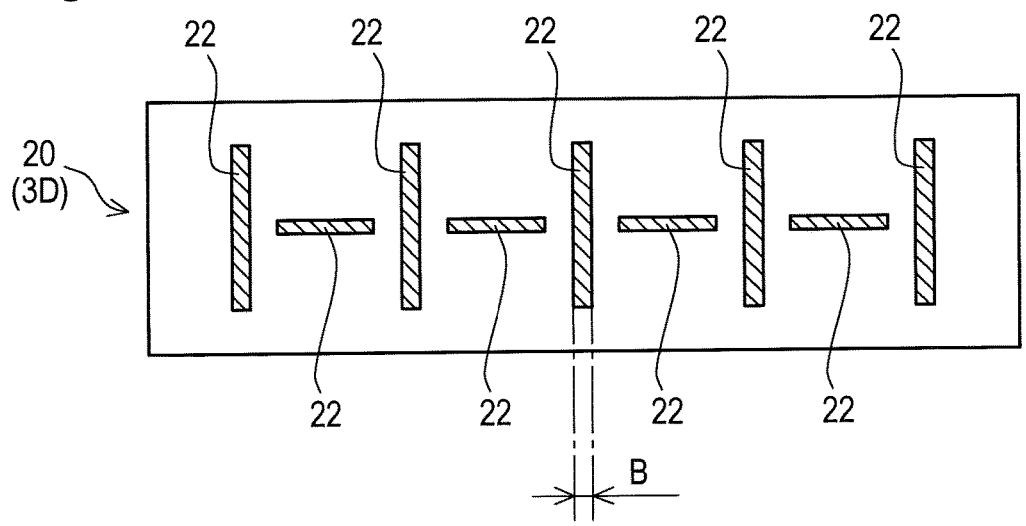

The projections 22 may be formed in a shape of a plurality of straight lines like the swash plate 3D according to a fifth embodiment as shown in FIG. 9(b). Specifically, the projections 22 are formed in a shape of straight lines having a predetermined length. The projections 22 are formed so as not to overlap with each other. According to the fifth embodiment, adjacent ones of the projections 22 extend in directions different from each other (by 90 degrees).

Note that the shape of the projections 22 is not limited to the above embodiments, and the projections 22 may have any shape.

INDUSTRIAL APPLICABILITY

The present invention is applicable to a compressor swash plate and a compressor equipped with the same.

REFERENCE SIGNS LIST

1: compressor
2: rotary shaft
3: swash plate
4: piston
5: shoe
10: base member
20: coating layer
21: groove portion
22: projection

The invention claimed is:
1. A compressor swash plate comprising:
a base member having a flat plate shape; and
a coating layer formed on a surface of the base member and having a projection formed in a linear shape,
wherein when a plane part formed on a pressing member is pressed against the coating layer with a pressure of 30 MPa, the coating layer is elastically deformed so that the following inequalities are satisfied,

$$0.01 \leq B \leq 0.06 \quad (1)$$

$$10 \leq S \leq 40 \quad (2)$$

$$0.001 \leq H \leq 0.01 \quad (3)$$

$$0.005 \leq T \leq 0.06 \quad (4)$$

where B indicates a width (mm) of a surface of the projection in contact with the plane part, S indicates a percentage (%) of a gross area of the surface of the projection in contact with the plane part relative to an area of a part of the coating layer against which the plane part is pressed, H indicates a height (mm) of the projection when the flat part is pressed on the coating layer, and T indicates a thickness (mm) of the coating layer when the flat part is pressed on the coating layer.

2. The compressor swash plate according to claim 1, wherein
the projection is formed in a shape of a plurality of concentric circles.

3. A compressor comprising:
the compressor swash plate according to claim 2;
a rotary shaft supporting the compressor swash plate in a rotatable manner; and
a piston configured to reciprocate as the compressor swash plate rotates.

4. The compressor swash plate according to claim 1, wherein
the projection is formed in a swirling shape.

5. A compressor comprising:
the compressor swash plate according to claim 4;
a rotary shaft supporting the compressor swash plate in a rotatable manner; and
a piston configured to reciprocate as the compressor swash plate rotates.

6. The compressor swash plate according to claim 1, wherein
the projection is formed in a shape of a plurality of annular rings of which center points are different from each other.

7. A compressor comprising:
the compressor swash plate according to claim 6;
a rotary shaft supporting the compressor swash plate in a rotatable manner; and
a piston configured to reciprocate as the compressor swash plate rotates.

8. A compressor comprising:
the compressor swash plate according to claim 1;
a rotary shaft supporting the compressor swash plate in a rotatable manner; and
a piston configured to reciprocate as the compressor swash plate rotates.

* * * * *